US008675596B2

(12) United States Patent
Lee et al.

(10) Patent No.: US 8,675,596 B2
(45) Date of Patent: Mar. 18, 2014

(54) METHOD AND APPARATUS OF RESERVING RESOURCE IN WIRELESS COMMUNICATION SYSTEM

(75) Inventors: Hyun Woo Lee, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 13/129,559

(22) PCT Filed: Dec. 29, 2009

(86) PCT No.: PCT/KR2009/007892
§ 371 (c)(1),
(2), (4) Date: May 16, 2011

(87) PCT Pub. No.: WO2010/079917
PCT Pub. Date: Jul. 15, 2010

(65) Prior Publication Data
US 2011/0222507 A1 Sep. 15, 2011

Related U.S. Application Data

(60) Provisional application No. 61/142,906, filed on Jan. 7, 2009.

(30) Foreign Application Priority Data

May 14, 2009 (KR) .................. 10-2009-0042040

(51) Int. Cl.
*H04W 4/00* (2009.01)
(52) U.S. Cl.
USPC ..................... 370/330; 370/436; 370/478
(58) Field of Classification Search
USPC ......... 370/310, 315, 316, 319, 321, 322, 326, 370/328, 329, 330, 345, 347, 348, 431, 436, 370/437, 464, 478; 455/403, 422.1, 450, 455/452.1, 462, 464
See application file for complete search history.

(56) References Cited

U.S. PATENT DOCUMENTS

| | | | |
|---|---|---|---|
| 2006/0211426 A1 | 9/2006 | Costa et al. | |
| 2007/0206559 A1 | 9/2007 | Cho et al. | |
| 2009/0061778 A1* | 3/2009 | Vrzic et al. | 455/62 |
| 2010/0111208 A1* | 5/2010 | Tsai et al. | 375/260 |
| 2011/0244870 A1* | 10/2011 | Lee | 455/444 |
| 2012/0069808 A1* | 3/2012 | Li et al. | 370/329 |

FOREIGN PATENT DOCUMENTS

KR 10-0826541 B1 4/2008

* cited by examiner

*Primary Examiner* — Obaidul Huq
(74) *Attorney, Agent, or Firm* — Birch, Stewart, Kolasch & Birch, LLP

(57) ABSTRACT

A method for resource reservation in a wireless communication system is provided. A plurality of physical resource units (PRUs) is provided and a reserved region is reserved. The reserved region is greater than or equal to a frequency band size of a subband which is a unit of contiguous PRUs in a frequency domain among the plurality of PRUs.

18 Claims, 8 Drawing Sheets

METHOD AND APPARATUS OF RESERVING RESOURCE IN WIRELESS COMMUNICATION SYSTEM

This application is the National Phase of PCT/KR2009/007892 filed on Dec. 29, 2009, which claims the benefit under 35 U.S.C. 119(e) of U.S. Provisional Application No. 61/142,906 filed on Jan. 7, 2009, and claims priority under 35 U.S.C. 119 (a) to Patent Application No. 10-2009-0042040 filed in Republic of Korea on May 14, 2009, all of which are hereby expressly incorporated by reference into the present application.

TECHNICAL FIELD

The present invention provides wireless communications, and more particularly, to a method and apparatus of reserving a resource for transmission of user data or a control signal.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

At present, there is ongoing standardization effort for the IEEE 802.16m standard which is a new technical standard based on the IEEE 802.16e. The IEEE 802.16e system uses a time division duplex (TDD) scheme in which a downlink (DL) and an uplink (UL) are divided in a time division manner, whereas the IEEE 802.16m is scheduled to use not only the TDD scheme but also a frequency division duplex (FDD) scheme in which the DL and the UL are divided in a frequency division manner. Furthermore, in order to improve a transfer rate, a frame of the IEEE 802.16m system is designed by considering bandwidth expansion, decrease in a cyclic prefix (CP) size, transmission in a subframe unit in which a frame is partitioned into a plurality of subframes, resource mapping in multiple cells, etc.

The resource mapping in multiple cells is a method in which a physical resource unit (PRU) is mapped to a contiguous resource unit (CRU) and a distributed resource unit (DRU) in a frequency domain and the CRU and the DRU are allocated to a cell (or sector) specific resource by dividing the CRU and the DRU into one or more frequency partitions. A subband is a unit of 4 contiguous PRUs among all PRUs. CRUs are configured in a subband unit. That is, after subband partitioning is performed to divide the PRU into the CRU and the DRU, a basic size of physically contiguous radio resources in the frequency domain is one subband. User data or a control signal may have a various size. Optionally, physically contiguous radio resources with a size greater than or equal to one subband or 4 PRUs in the frequency domain may be necessarily used for the user data or the control signal. However, there is no proposed method capable of allocating a radio resource for a channel requiring the physically contiguous radio resources with a size greater than or equal to one subband or 4 PRUs in the frequency domain. In addition, even in a case of using physically contiguous PRUs with a size less than or equal to 4 PRUs in the frequency domain, a specific region cannot be randomly used in a full frequency domain, and thus can be used limitedly only within a resource allocated to the subband.

Accordingly, there is a need for a method capable of transmitting user data or a control signal requiring physically contiguous radio resources greater than or equal to a predetermined size in a frequency domain.

DISCLOSURE OF INVENTION

Technical Problem

The present invention provides a method and apparatus of reserving a resource for effectively transmitting user data or a control signal requiring physically contiguous radio resources greater than or equal to a predetermined size in a frequency domain.

Solution to Problem

A method for resource reservation in a wireless communication system is provided. The method includes providing a plurality of physical resource units (PRUs), and reserving a reserved region greater than or equal to a frequency band size of a subband which is a unit of contiguous PRUs in a frequency domain among the plurality of PRUs, wherein each PRU comprises a plurality of contiguous subcarriers in the frequency domain. The method may further include partitioning the remaining PRUs other than the reserved region into a subband which is a unit of contiguous PRUs in the frequency domain and a miniband which is a unit of distributed PRUs in the frequency domain. The method may further include performing permutation on PRUs included in the miniband according to a pre-defined mapping rule. The method may further include reordering the remaining PRUs other than the reserved region according to a predetermined rule, and partitioning the reordered PRUs into a subband which is a subband which is a unit of contiguous PRUs in the frequency domain and a miniband which is a unit of distributed PRUs in the frequency domain. The reserved region may have a size which is a multiple of a size of the subband. The reserved region may be pre-partitioned in the plurality of PRUs and then an index is assigned to the reserved region according to a location and order by which the reserved region is used. The method may further include transmitting the index of the reserved region. The reserved region may be for a control channel. PRUs included in the reserved region may not be subjected to partitioning and permutation. Information on the reserved region may be broadcast. Each PRU may comprise contiguous orthogonal frequency division multiple access (OFDMA) symbols in a time domain.

Advantageous Effects of Invention

Since a channel requiring contiguous radio resources greater than or equal to a determined size can be allocated, a various-sized control signal or user data can be effectively transmitted.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Figure 1:
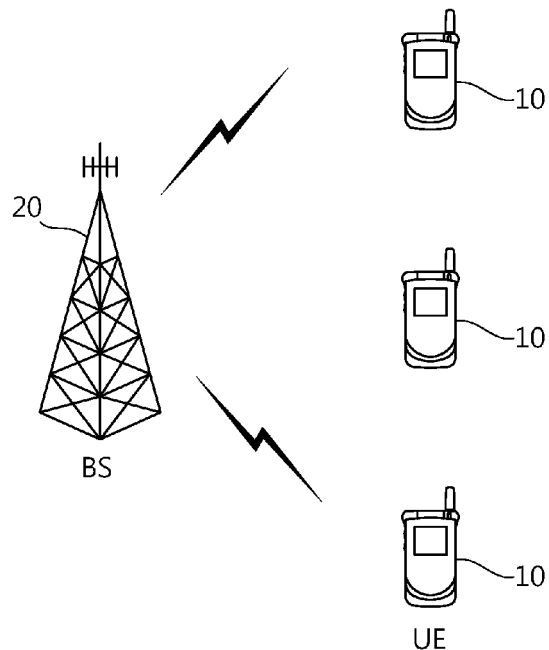
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

Hereinafter, a downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
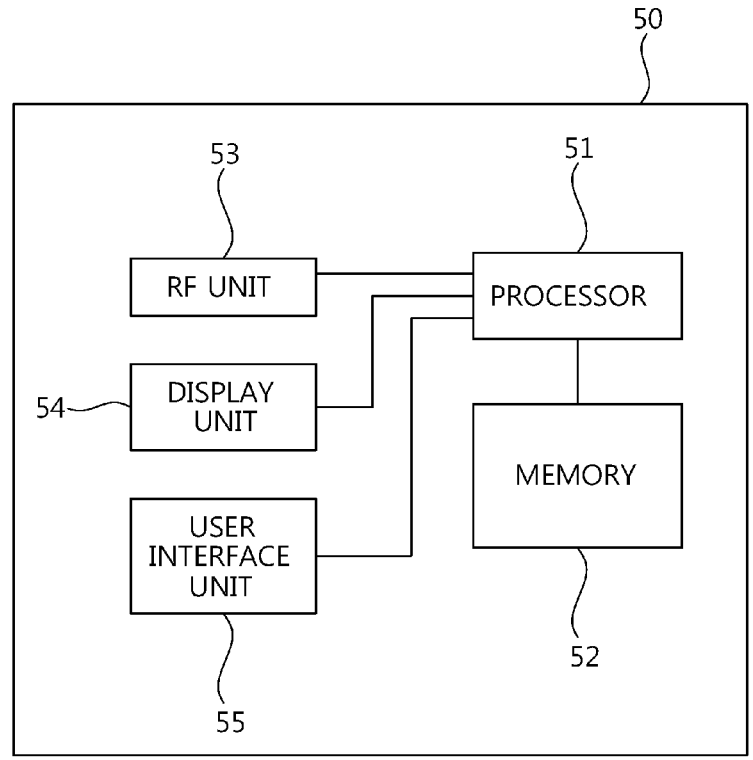
FIG. 2 is a block diagram showing constitutional elements of a user equipment.

FIG. 2 is a block diagram showing constitutional elements of a UE.

Referring to FIG. 2, a UE 50 includes a processor 51, a memory 52, a radio frequency (RF) unit 53, a display unit 54, and a user interface unit 55. Layers of a radio interface protocol are implemented in the processor 51. The processor 51 provides a control plane and a user plane. The function of each layer can be implemented in the processor 51. The processor 51 processes transmitted and received user data and/or control signals.

The memory 52 is coupled to the processor 51 and stores an operating system of the UE, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Figure 3:
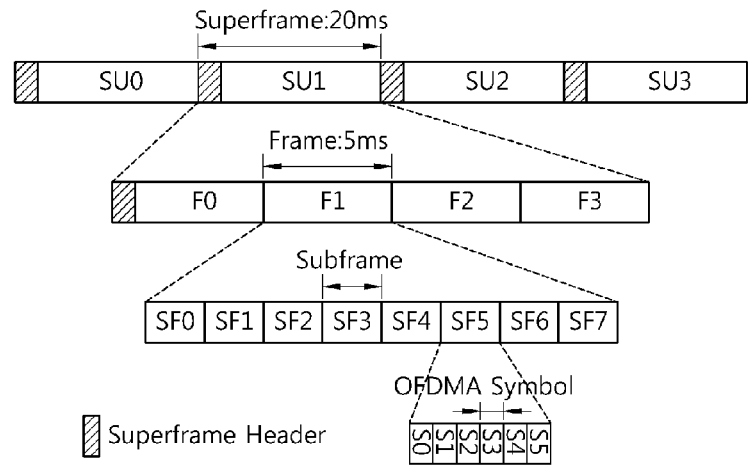
FIG. 3 shows an example of a frame structure.

FIG. 3 shows an example of a frame structure.

Referring to FIG. 3, a superframe (SU) includes a superframe header (SFH) and four radio frames F0, F1, F2, and F3. Although it is shown that each superframe has a size of 20 milliseconds (ms) and each frame has a size of 5 ms, the present invention is not limited thereto. The SFH may be located at a front-most position of the superframe. A common control channel is allocated to the SFH. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 orthogonal frequency division multiple access (OFDMA) symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission can be simultaneously performed while occupying different frequency bands.

A subframe includes at least one frequency partition. The frequency partition consists of at least one physical resource unit (PRU). The frequency partition may include a contiguous/localized PRU and/or a distributed/non-contiguous PRU. The frequency partition may be used for other purposes such as fractional frequency reuse (FFR) or multicast or broadcast service (MBS).

The PRU is defined as a basic physical unit for allocating resources including a plurality of physically contiguous OFDMA symbols and a plurality of physically contiguous subcarriers. The number of OFDMA symbols included in the PRU may be equal to the number of OFDMA symbols included in one subframe. For example, when one subframe consists of six OFDMA symbols, the PRU may be defined with 18 subcarriers and six OFDMA symbols. A logical resource unit (LRU) is a basic logical unit for distributed resource allocation and localized resource allocation. The LRU is defined with a plurality of OFDMA symbols and a plurality of subcarriers, and includes pilots used in the PRU. Therefore, one LRU includes a proper number of subcarriers, where the proper number depends on the number of allocated pilots.

A distributed resource unit (DRU) may be used to obtain a frequency diversity gain. The DRU includes a distributed subcarrier group in one frequency partition. The DRU has the same size as the PRU. In the DRU, one or more subcarriers may be a minimum unit of physically contiguous subcarriers constituting each of the distributed subcarrier groups.

A contiguous resource unit (CRU) may be used to obtain a frequency selective scheduling gain. The CRU includes a localized subcarrier group. The CRU has the same size as the PRU. The CRU and the DRU may be supported in the frequency domain by using a frequency division multiplexing (FDM) scheme.

Figure 4:
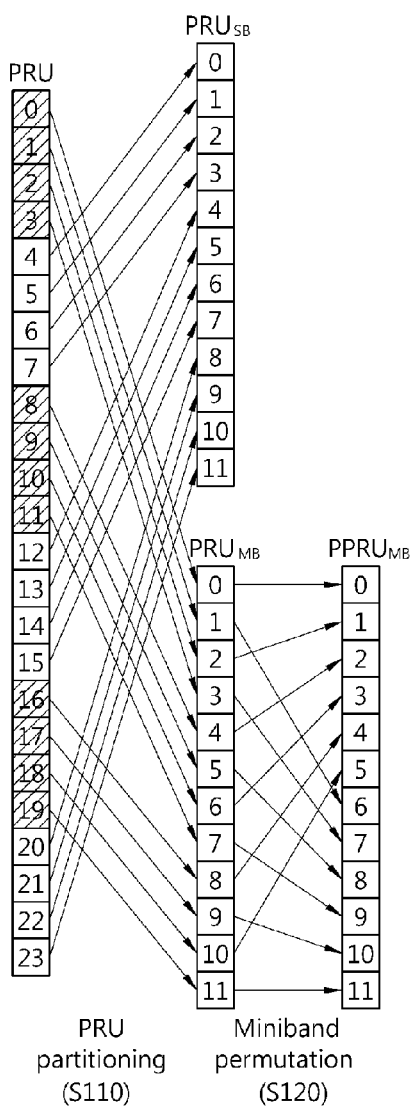
FIG. 4 shows exemplary mapping of a physical resource unit (PRU).

FIG. 4 shows exemplary mapping of a PRU.

Referring to FIG. 4, all subcarriers used in a system bandwidth constitute PRUs. One PRU may include 18 subcarriers in a frequency domain and may consist of 6 OFDMA symbols or 7 OFDMA symbols in a time domain. The number of OFDMA symbols included in the PRU depends on a subframe type. The subframe type is classified into a subframe type 1 including 6 OFDMA symbols and a subframe type 2 including 7 OFDMA symbols. However, the present invention is not limited thereto, and thus the subframe type may be defined as another subframe type including various OFDMA symbols, e.g., 5 OFDMA symbols, 9 OFDMA symbols, etc.

PRUs are partitioned into a subband and a miniband according to a pre-defined PRU partitioning rule (step S110). The subband denotes a unit of contiguous PRUs in the frequency domain or a minimum unit for constituting a CRU. A size of the subband in the frequency domain may be 4 PRUs. The miniband denotes a unit of a distributed PRU or a unit for constituting a DRU. A size of the miniband in the frequency domain may be 1 PRU or a multiple integer of the PRU. All PRUs can be allocated to the subband or the miniband by being selected in a 4-PRU unit corresponding to the size of the subband. PRUs belonging to the subband are referred to as $PRU_{SB}$, and PRUs belonging to the miniband are referred to as $PRU_{MB}$. The number of all PRUs is equal to the sum of the number of $PRU_{SB}$ and the number of $PRU_{MB}$. The $PRU_{SB}$ of the subband and the $PRU_{MB}$ of the miniband are reordered. The $PRU_{SB}$ of the subband is numbered from 0 to (the number of $PRU_{SB}$−1). The $PRU_{MB}$ of the miniband is numbered from 0 to (the number of $PRU_{MB}$−1).

The $PRU_{MB}$ of the miniband is subjected to miniband permutation so that the $PRU_{MB}$ is permutated in the frequency domain to ensure frequency diversity in each frequency partition (step S120). That is, the numbered $PRU_{MB}$ is permutated to generate a permuted-$PRU_{MB}$ ($PPRU_{MB}$) according to a pre-defined permutation rule (or mapping rule).

Thereafter, the $PRU_{SB}$ and the $PRU_{MB}$ are allocated to one or more frequency partitions. Each frequency partition is subjected to a cell-specific resource mapping process such as CRU/DRU allocation, sector-specific permutation, subcarrier permutation, etc.

As such, in the process of PRU partitioning, the PRUs are selected in a 4-PRU unit and are then allocated to the subband and the miniband. Thus, a basic size of physically contiguous CRUs in the frequency domain is 4 PRUs. That is, a physically contiguous frequency band in the frequency domain can be ensured only in a 4-PRU unit. When user data or a control signal uses radio resources with a size less than 4 PRUs, some PRUs among 4 contiguous PRUs in the frequency domain can be allocated. However, when the user data or the control signal uses radio resources with a size greater than 4 PRUs, contiguous PRUs with a size greater than or equal to 4 PRUs in the frequency domain cannot be allocated. That is, a channel requiring contiguous PRUs with a size greater than or equal to 4 PRUs is not supported. There is a limitation in radio resource allocation for various-sized data (hereinafter, data includes the user data and the control signal). In addition, when the user data or the control signal uses radio resources requiring contiguous PRUs with a size less than or equal to 4 PRUs, allocation of the user data or the control signal in the frequency domain is limited to a region in which the subband is allocated.

Now, a method capable of supporting a channel requiring physically contiguous PRUs with a size greater than or equal to one subband or 4 PRUs in a frequency domain will be described. The present invention is not limited to UL transmission and DL transmission, and is not also limited to types of user data and a control signal. For example, the channel requiring physically contiguous PRUs with a size greater than or equal to one subband or 4 PRUs in the frequency domain may include various channels such as a ranging channel for control signal transmission, a sounding channel, a broadcast channel, a preamble, a midamble, a paging channel, etc.

Figure 5:
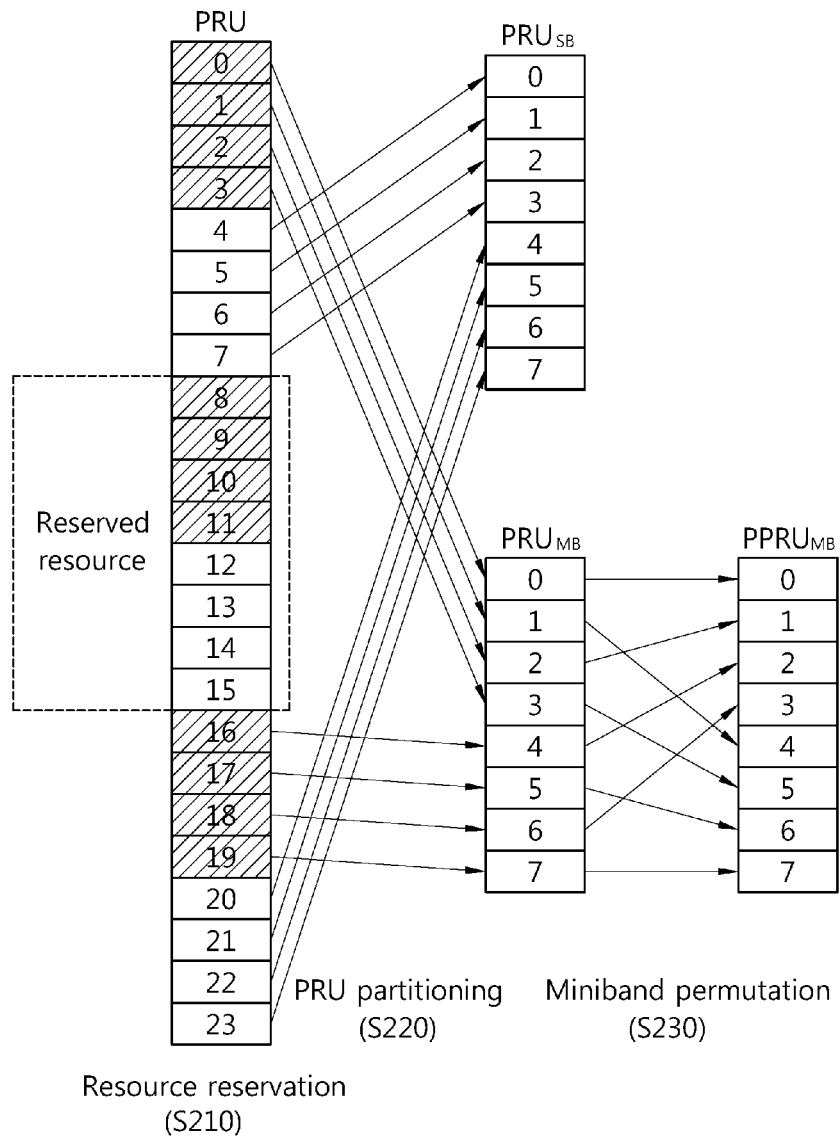
FIG. 5 shows mapping of a PRU according to an embodiment of the present invention.

FIG. 5 shows mapping of a PRU according to an embodiment of the present invention.

Referring to FIG. 5, a radio resource is reserved for transmission of specific data in a plurality of PRUs (step S210). The plurality of PRUs is provided for resource reservation. A reserved region has a size greater than or equal to a frequency band size of a subband which is a unit of contiguous PRUs in a frequency domain among the plurality of PRUs. Each PRU includes a plurality of contiguous subcarriers in the frequency domain. When all of PRUs are partitioned into a subband and a miniband by the frequency band size of a subband (i.e., 4 PRUs), it is not possible to allocate physically contiguous CRUs greater than or equal to the frequency band size of the subband in the frequency domain. Therefore, if the CRUs greater than or equal to the frequency band size of the subband are required, specific PRUs are reserved as CRUs for transmission of specific data before the PRU partitioning process. The PRUs reserved for transmission of specific data is referred to as a reserved region or a reserved resource. An index is assigned to each PRU, and the reserved region may be indicated by the index of each PRU. For example, when all of the PRUs are indexed with 0 to 23, reserved regions may be indicated by the PRU indices 8 to 15. Alternatively, the index of the reserved region may be prepared additionally. PRUs in the reserved region are not subjected to subband partitioning and miniband permutation.

A minimum unit of the reserved region is a multiple of the PRU, and can be defined as follows.

(1) The minimum unit of the reserved region may be set to a size of a miniband or a multiple of the miniband size. The miniband may have a size of 1 or 2 PRUs. If the miniband size is 2 PRUs, the minimum unit of the reserved region may be 2 PRUs. Since contiguous 2 PRUs or 4 PRUs can be selected from the subband, the reserved region is not much effectively utilized. Therefore, it is effective to set the minimum unit of the reserved region to 6 PRUs, which is triple of the miniband size.

(2) The minimum unit of the reserved region may be set to a size of a subband or a multiple of the subband size. The subband may have a size of 4 PRUs. Although the minimum unit of the reserved region can be set to 4 PRUs, contiguous 4 PRUs may be selected from the subband without utilizing the reserved region. Therefore, it is effective to set the minimum unit of the reserved region to 8 PRUs, which is twice of the subband size.

(3) The minimum unit of the reserved region may be set to a size of a frequency domain for a specific channel requiring contiguous PRUs or a multiple of that size. For example, if a size of a frequency domain required for a ranging channel is 6 PRUs, the minimum unit of the reserved region may be set to 6 PRUs.

(4) The minimum unit of the reserved region may be set to a value which is a minimum multiple of a subband and is greater than a size of a frequency domain for a specific channel requiring contiguous PRUs. For example, if the frequency domain required for the ranging channel has a size of 6 PRUs, the minimum unit of the reserved region may be set to 8 PRUs, which is a minimum multiple of a subband and is greater than 6 PRUs.

Remaining PRUs other than the reserved radio resources are partitioned into a subband and a miniband (step S220). The remaining PRUs may be selected in a 4-PRU unit (i.e., a subband size) and then may be allocated to the subband and the miniband. For example, among the remaining PRUs, an odd-order PRU group of the 4-PRU unit may be allocated to a $PRU_{SB}$, and an even-order PRU group thereof may be allocated to a $PRU_{MB}$. A PRU belonging to the subband is referred to as the $PRU_{SB}$. A PRU belonging to the miniband is referred to as the $PRU_{MB}$. A reserved PRU is referred to as $PRU_{RES}$. The total number of PRUs is equal to the sum of the number of $PRU_{SB}$, the number of $PRU_{MB}$, and the number of $PRU_{RES}$. The $PRU_{SB}$ of the subband and the $PRU_{MB}$ of the miniband are reordered. The $PRU_{SB}$ is numbered from 0 to (the number of $PRU_{SB}-1$). The $PRU_{MB}$ is numbered from 0 to (the number of $PRU_{MB}-1$).

The $PRU_{MB}$ of the miniband is permutated to a $PPRU_{MB}$ according to a predetermined miniband permutation rule (or mapping rule) (S230).

As such, the reserved region for transmission of specific data is prepared before a plurality of PRUs are partitioned into the subband and the miniband, so as to support the channel requiring physically contiguous radio resources with a size greater than or equal to 4 PRUs in the frequency domain.

Figure 6:
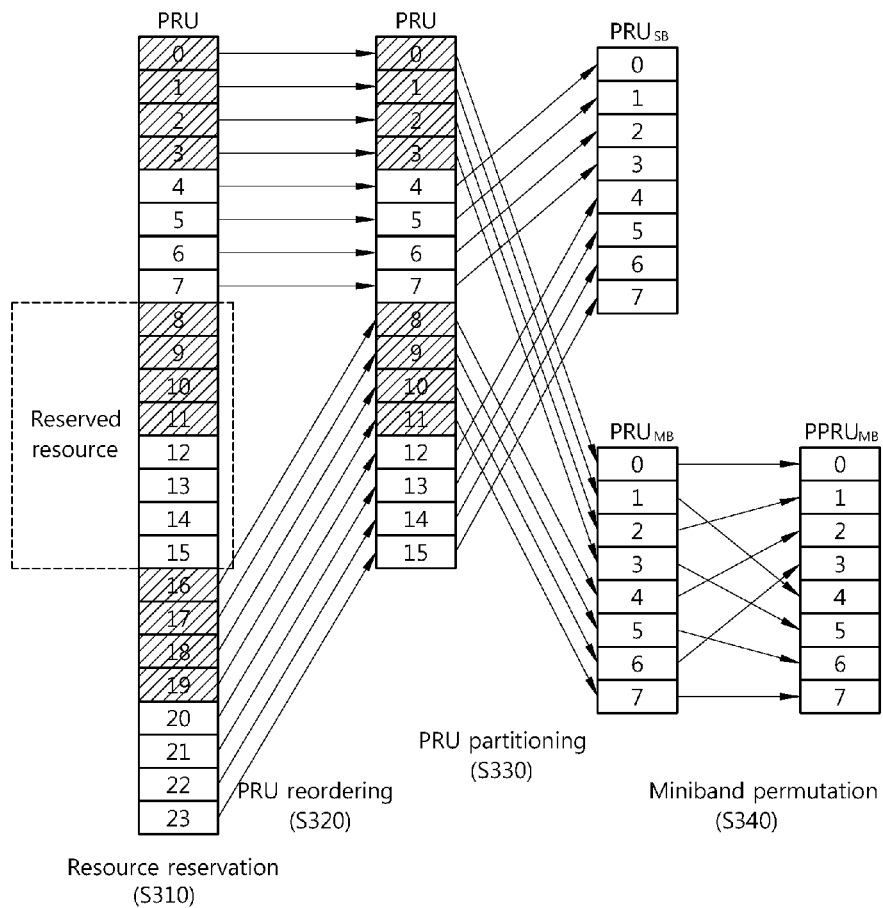
FIG. 6 shows mapping of a PRU according to another embodiment of the present invention.

FIG. 6 shows mapping of a PRU according to another embodiment of the present invention. In comparison with FIG. 5, the mapping of FIG. 6 further includes a process of reordering remaining PRUs.

Referring to FIG. 6, a radio resource is reserved for transmission of specific data in a plurality of PRUs (step S310), and remaining PRUs other than the reserved radio resource are reordered (step S320). If a plurality of PRUs that can be used in a system bandwidth are referred to as 1st available PRUs, the remaining PRUs other than the reserved radio resource are used to configure 2nd available PRUs according to a predetermined reordering rule (or mapping rule or numbering rule). Although the 2nd available PRUs are configured by sequentially gathering the remaining PRUs, there is no restriction on the reordering rule for configuring the 2nd available PRUs. An index of each of the 2nd available PRUs may be newly assigned.

The 2nd available PRUs are partitioned into a subband and a miniband (step S330). The 2nd available PRUs may be selected in a 4-PRU unit (i.e., a subband size) and then may be allocated to the subband and the miniband. The number of the 2nd available PRUs is equal to the sum of the number of $PRU_{SB}$ and the number of $PRU_{MB}$. The number of the 1st available PRUs is equal to the number of the 2nd available PRUs and the number of the $PRU_{RES}$.

The $PRU_{MB}$ of the miniband is permutated to a $PPRU_{MB}$ according to a predetermined miniband permutation rule (or mapping rule) (step S340).

Although it has been described above that one reserved region is reserved in a plurality of PRUs, the present invention is not limited thereto, and thus a plurality of reserved regions may be reserved in a plurality of PRUs. The plurality of reserved regions may be contiguous or non contiguous in a frequency domain. Therefore, one or more control signals or user data may be transmitted using radio resources with a size greater than or equal to 4 PRUs in the frequency domain. In order to transmit and receive data by using the reserved region, a BS has to announce a location of the reserved region to a UE or the location of the reserved region has to be predetermined.

Figure 7:
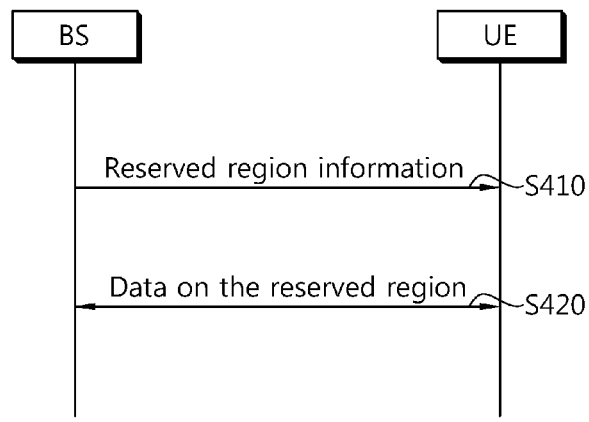
FIG. 7 shows a data transmission method according to an embodiment of the present invention.

FIG. 7 shows a data transmission method according to an embodiment of the present invention.

Referring to FIG. 7, a BS transmits reserved region information to a UE (step S410). The reserved region information may be transmitted using a broadcast message. The reserved region information may indicate a location and size of a reserved region. The reserved region may be randomly determined in a system frequency band. The location and size of the reserved region may be indicated by using a subcarrier index. However, when the location and size of the reserved region are indicated by using the subcarrier index, a signaling overhead for indicating the reserved region may increase.

To reduce the overhead caused by the reserved region information, a plurality of reserved regions may be pre-partitioned in a frequency domain, and the reserved region information may indicate a pre-partitioned reserved region. That is, the reserved region information may include an index of the pre-partitioned reserved region. Since only the index of the reserved region can be transmitted by pre-partitioning the reserved region, the signaling overhead for indicating the reserved region can be reduced. The index of the reserved region may be assigned sequentially in the frequency domain, or may be assigned by considering an allocation order of the reserved region. When the index of the reserved region is assigned sequentially in the frequency domain, signaling for the location of the reserved region may not be additionally performed, and signaling may be performed to know the number of reserved regions to be allocated in the frequency domain.

The UE can know the location or the number of reserved regions to be used upon receiving the reserved region information, and can receive data from the BS or transmit data to the BS by using the reserved region (step S420). A plurality of PRUs are provided for radio resource reservation, and the UE can reserve a reserved region greater than or equal to of a frequency band size of a subband among the plurality of PRUs according to the reserved region information. Data includes user data and a control signal. For example, the UE may transmit a ranging signal by using the reserved region. Various channels requiring consecutive PRUs greater than or equal to a subband size in the frequency domain can be allocated to the resource region. For example, the reserved region may be allocated with a ranging channel, a sounding channel, a broadcast channel, a preamble, a midamble, a paging channel, etc. Various control signals (e.g., a ranging signal, a sounding signal, system information, a synchronization signal, a paging signal, etc.) or user data can be transmitted using the reserved region.

Now, a method for allocating a reserved region pre-partitioned to reduce an overhead caused by reserved region information and for assigning an index will be described.

Figure 8:
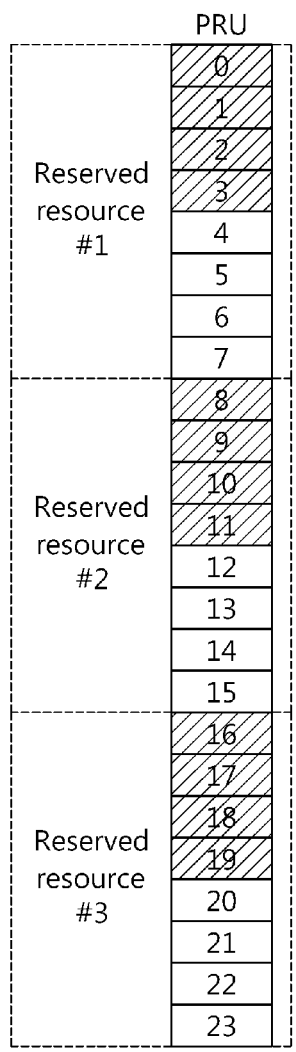
FIG. 8 shows a reserved region according to an embodiment of the present invention.

FIG. 8 shows a reserved region according to an embodiment of the present invention.

Referring to FIG. 8, one or more reserved regions may be pre-defined in a minimum unit of the reserved region in a plurality of PRUs. The reserved region may be predefined for some or all of the PRUs. For example, the minimum unit of the reserved region may be 8 PRUs, and some or all of the PRUs may be partitioned in an 8-PRU unit. An index is assigned to the partitioned reserved region. The index of the reserved region can be understood as a parameter for announcing a location of the reserved region. Alternatively, the index of the reserved region can be understood as a parameter for indicating an order and location by which the pre-defined reserved region is used sequentially.

As illustrated, the index of the reserved region may be assigned sequentially from any one side of a system band. The index of the reserved region may be assigned in the same (or opposite) order as a PRU index. The PRU index may be assigned in a descending or ascending order in a frequency domain, and the order of the reserved region is not limited thereto. When the index of the reserved region indicates only a location of the reserved region, a BS transmits each of indices of the reserved region. For example, in case of using reserved regions #1, #2, and #3, the BS transmits indices #1, #2, and #3 of the reserved regions. When the index of the reserved region indicates a location and order of reserved regions used sequentially, the BS may transmit the number of the reserved regions in use. For example, in case of using the reserved regions #1, #2, and #3, the BS may announce that 3 reserved regions are used, and a UE may announce that the reserved regions can be used sequentially from the reserved region #1 to the reserved region #3.

Hereinafter, it is assumed that the index of the reserved region indicates a location and order by which pre-defined reserved regions are used sequentially.

Figure 9:
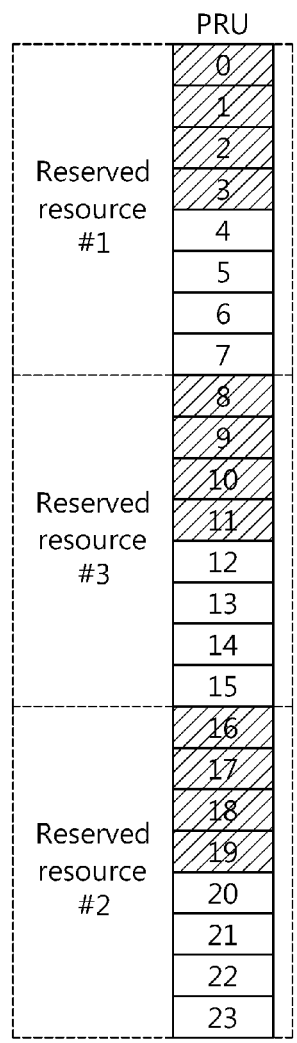
FIG. 9 shows a reserved region according to another embodiment of the present invention.

FIG. 9 shows a reserved region according to another embodiment of the present invention.

Referring to FIG. 9, an index of the reserved region may be assigned alternately starting from any one side of a system bandwidth to the other side of the system bandwidth. The index of the reserved region may be assigned in the same (or opposite) order as a PRU index.

When the index of the reserved region is assigned starting from both ends of the system bandwidth and the reserved region is used sequentially according to the index of the reserved region, remaining radio resources other than the reserved region occupy a middle portion of the system bandwidth. The middle portion of the system bandwidth may be used in the same manner as when a small system bandwidth is used. For example, when the reserved region is used by 5 MHz starting from both ends of a 20 MHz system bandwidth, the remaining 10 MHz bandwidth can be used in the same manner as in resource unit mapping of a 10 MHz system bandwidth.

Figure 10:
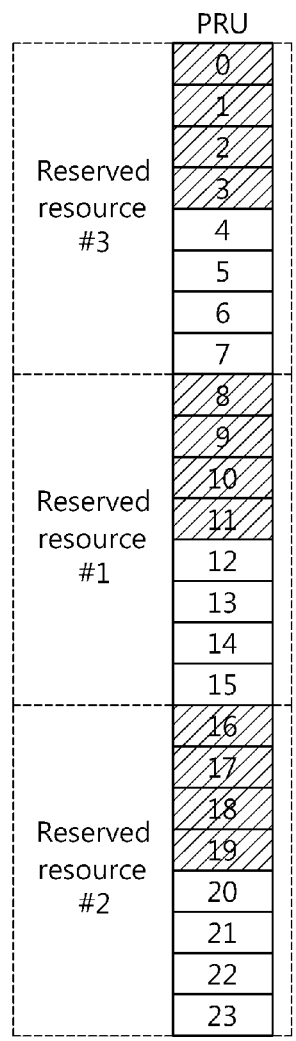
FIG. 10 shows a reserved region according to another embodiment of the present invention.

FIG. 10 shows a reserved region according to another embodiment of the present invention.

Referring to FIG. 10, an index of the reserved region may be assigned starting from a middle portion of a system bandwidth. The index of the reserved region may be assigned alternately toward both ends from the middle portion of the system bandwidth. The index of the reserved region may be assigned in the same (or opposite) order as a PRU index.

When the index of the reserved region is assigned sequentially from any one side of the system bandwidth or is assigned alternately from both ends of the system bandwidth, a frequency domain of the remaining radio resources may be significantly narrowed. Therefore, when a DRU is configured using the remaining radio resources, a frequency diversity gain may decrease. When the index of the reserved region is assigned starting from the middle portion of the system bandwidth, the remaining radio resources are located at both ends of the system bandwidth, and thus the frequency diversity gain can be sufficiently obtained.

Figure 11:
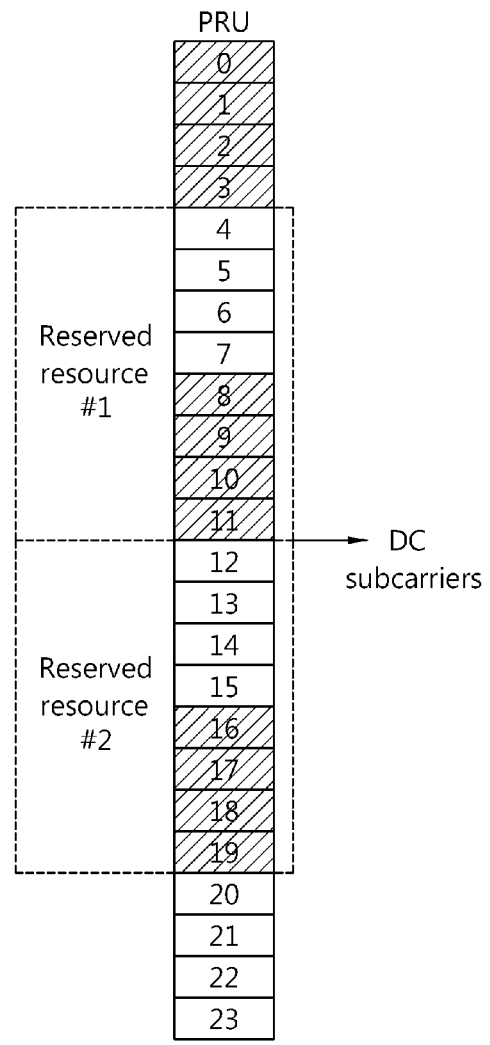
FIG. 11 shows a reserved region according to another embodiment of the present invention.

FIG. 11 shows a reserved region according to another embodiment of the present invention.

Referring to FIG. 11, the reserved region may be defined in a plurality of PRUs while preventing a DC subcarrier from being included in the reserved region. An index of the reserved region may be assigned starting from a reserved region of a middle portion adjacent to the DC subcarrier toward both ends of a system bandwidth. A reserved region #1 is adjacent to one side of the DC subcarrier. A reserved region #2 is adjacent to the other side of the DC subcarrier. Thereafter, the index of the reserved region may be assigned alternately toward both ends of the system bandwidth from the reserved regions #1 and #2, or may be assigned sequentially according to increase of a PRU index.

If the reserved region includes the DC subcarrier, a problem may occur when a channel using the reserved region allocates a radio resource by considering the DC subcarrier. For example, in a case where a ranging channel uses a subcarrier spacing different from that of data within contiguous physical time/frequency resources, if the DC subcarrier is located within a radio resource of the ranging channel, a subcarrier of the ranging channel has to be punctured, which is a problem to be considered. To avoid such a problem, the reserved region may be defined such that the DC subcarrier is not included in the reserved region. When the index of the reserved region is assigned starting from a reserved region of the middle portion adjacent to the DC subcarrier, the remaining radio resources are located at both ends of the system bandwidth and thus a frequency diversity gain can be sufficiently obtained.

Although it has been described above with reference to FIG. 8 to FIG. 11 that reserved regions in an 8-PRU unit do not overlap with one another, a minimum unit of the reserved regions may be determined variously as described above, and thus the reserved regions may overlap with other adjacent reserved regions. Adjacent reserved regions may overlap with one another in a size equal to a divisor of the minimum unit of the reserved regions so that the reserved regions can be flexibly allocated in a region to which the reserved regions can be allocated. For example, if the minimum unit of the reserved regions is 8 PRUs, 2 PRUs and 4 PRUs of the adjacent reserved regions can overlap with one another.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for resource reservation in a wireless communication system, the method comprising:

providing, by a base station, a plurality of physical resource units (PRUs);

reserving, by the base station, a reserved region greater than or equal to a frequency band size of a subband which is a unit of contiguous PRUs in a frequency domain among the plurality of PRUs; and partitioning, by the base station, the remaining PRUs other than the reserved region into a subband that is a unit of contiguous PRUs in the frequency domain and a miniband that is a unit of distributed PRUs in the frequency domain, wherein each PRU comprises a plurality of contiguous subcarriers in the frequency domain, and wherein the reserved region is pre-partitioned in the plurality of PRUs and then an index is assigned to the reserved region according to a location and order by which the reserved region is used.

2. The method of claim 1, further comprising performing permutation on PRUs included in the miniband according to a pre-defined mapping rule.

3. The method of claim 1, further comprising reordering the remaining PRUs other than the reserved region according to a predetermined rule.

4. The method of claim 1, wherein the reserved region has a size which is a multiple of a size of the subband.

5. The method of claim 1, further comprising transmitting the index of the reserved region.

6. The method of claim 1, wherein the reserved region is for a control channel.

7. The method of claim 1, wherein PRUs included in the reserved region are not subjected to partitioning and permutation.

8. The method of claim 1, wherein information on the reserved region is broadcast.

9. The method of claim 1, wherein each PRU comprises contiguous orthogonal frequency division multiple access (OFDMA) symbols in a time domain.

10. An apparatus in a wireless communication system, the apparatus comprising:

a radio frequency (RF) unit for transmitting or receiving a radio signal; and a processor coupled to the RF unit, and configured to provide a plurality of physical resource units (PRUs);

reserve a reserved region greater than or equal to a frequency band size of a subband which is a unit of contiguous PRUs in a frequency domain among the plurality of PRUs; and partition the remaining PRUs other than the reserved region into a subband that is a unit of contiguous PRUs in the frequency domain and a miniband that is a unit of distributed PRUs in the frequency domain, wherein each PRU comprises a plurality of contiguous subcarriers in the frequency domain, and wherein the reserved region is pre-partitioned in the plurality of PRUs and then an index is assigned to the reserved region according to a location and order by which the reserved region is used.

11. The apparatus of claim 10, wherein the processor is further configured to perform permutation on PRUs included in the miniband according to a pre-defined mapping rule.

12. The apparatus of claim 10, wherein the processor is further configured to reorder the remaining PRUs other than the reserved region according to a predetermined rule.

13. The apparatus of claim 10, wherein the reserved region has a size which is a multiple of a size of the subband.

14. The apparatus of claim 10, wherein the processor is further configured to transmit the index of the reserved region.

15. The apparatus of claim 10, wherein the reserved region is for a control channel.

16. The apparatus of claim 10, wherein PRUs included in the reserved region are not subjected to partitioning and permutation.

17. The apparatus of claim 10, wherein information on the reserved region is broadcast.

18. The apparatus of claim 10, wherein each PRU comprises contiguous orthogonal frequency division multiple access (OFDMA) symbols in a time domain.

* * * * *